April 30, 1929.　　　O. U. ZERK　　　1,710,959
LUBRICANT RESERVOIR AND DASH PUMP
Filed Jan. 15, 1927
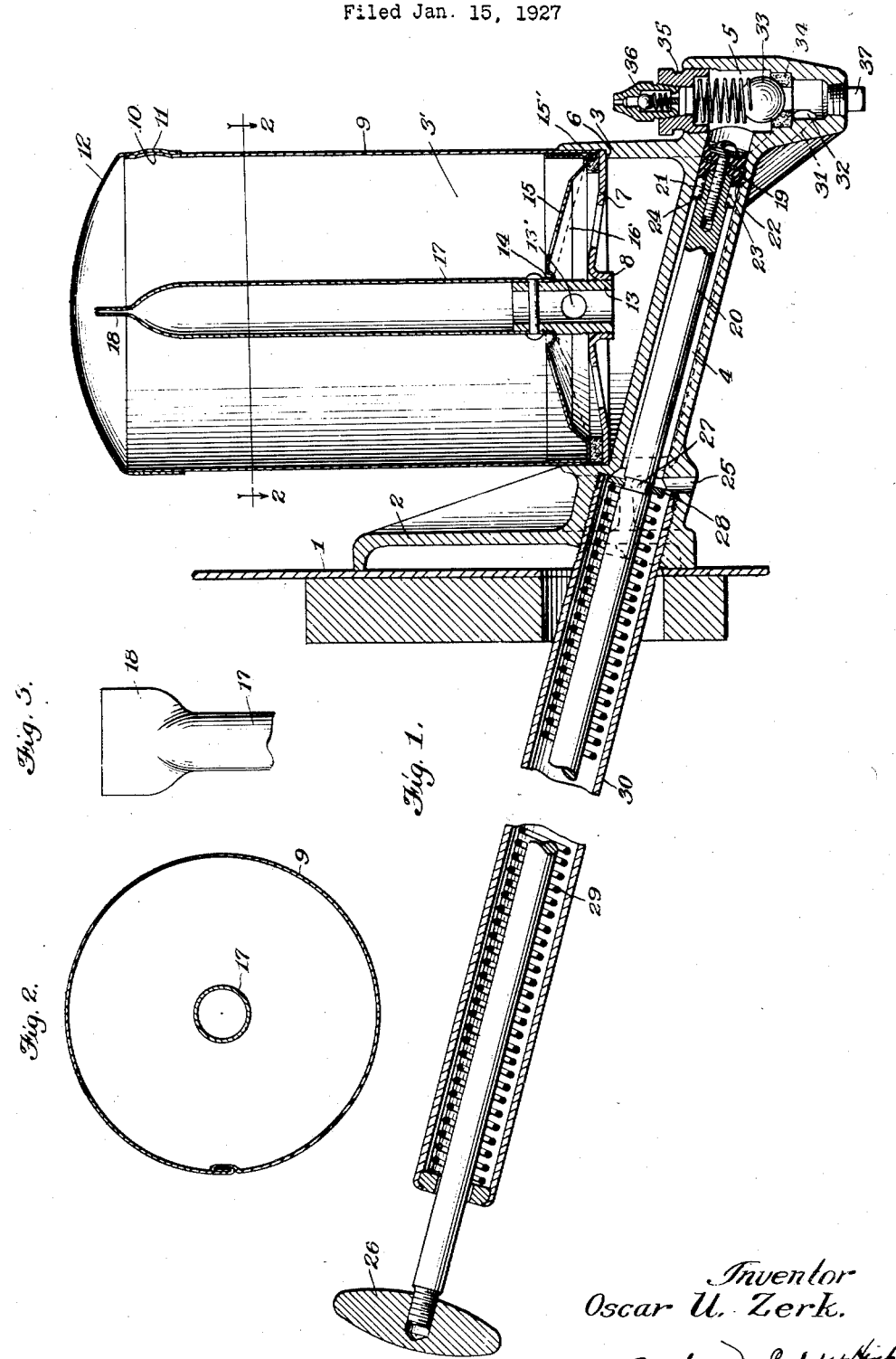
Inventor
Oscar U. Zerk.

Patented Apr. 30, 1929.

1,710,959

UNITED STATES PATENT OFFICE.

OSCAR U. ZERK, OF CHICAGO, ILLINOIS, ASSIGNOR TO ALEMITE MANUFACTURING CORPORATION, OF CHICAGO, ILLINOIS, A CORPORATION OF DELAWARE.

LUBRICANT RESERVOIR AND DASH PUMP.

Application filed January 15, 1927. Serial No. 161,283.

My invention relates to a combined lubricant reservoir and pump to be used as part of a so-called centralized system of lubrication. Centralized systems of lubrication generally comprise a lubricant reservoir, or other source of lubricant supply, branched conduits leading to a plurality of bearings to be lubricated, metering means adjacent the bearings and associated with the conduits to regulate the amount of lubricant supplied to the bearings, and a lubricant pump or similar means for withdrawing lubricant from the reservoir and forcing it through the conduits and into the bearings. Lubricating systems of this kind are now being used on automotive vehicles and it is for such use that my invention is particularly adapted.

An object of my invention is to provide a combined lubricant reservoir and pump unit for centralized lubricating systems.

Another object is to provide a unit of this type which is simple in construction, economical to manufacture and reliable in operation.

Another object is to provide a combined lubricant reservoir and pump unit which is extremely compact and at the same time has the vital parts thereof accessible for inspection and repair.

Another object is to provide a new and improved reservoir.

Another object is to provide a reservoir having a strainer therein and means for permitting the escape of air trapped beneath said strainer when lubricant is poured into the reservoir.

Another object is to provide a new and improved pump and a novel piston therefor.

Another object is to provide a combined lubricant reservoir and pump therefor adapted for mounting on the engine compartment side of the dash and having all lubricant containing parts located in the engine compartment but having operating means extending into the passenger compartment.

Another object is to provide means whereby said lubricating system may be readily connected with means for priming said system or high pressure means for blowing out air trapped therein.

Other objects and advantages will appear as the description proceeds.

Referring to the drawings:

Figure 1 is a sectional elevation of my new and improved unit;

Figure 2 is a section on the line 2—2 of Figure 1; and

Figure 3 is a side view of the upper end of the air vent tube shown in Figure 1.

In the drawings, the dash which is commonly used in automotive vehicles to separate the engine compartment from the driver's compartment is indicated by the numeral 1, that part of the apparatus shown in Figure 1 to the right of the dash being in the engine compartment and that part shown to the left of the dash extending into the driver's compartment. Secured to the dash 1, by any well known attaching means (not shown), is a bracket 2 which carries my new and improved device. The bracket 2 forms one part of an integral casting having a part 3 forming the base of the reservoir 3', a part 4 forming the pump cylinder, and a part 5 forming a valve chamber.

The base 3 of the reservoir 3' has an annular shoulder 6 which supports a perforated plate 7 having a threaded central opening 8, for a purpose to be hereafter described, and also supports the lower end of the reservoir shell 9. The upper end of the shell 9 projects outwardly at 10 to co-operate with a depression 11 in the cap 12 in forming resilient means for maintaining said cap firmly on the upper end of the reservoir.

Into the threaded opening in the plate 7 is inserted a combined strainer and air vent unit comprising a tubular member 13 having a shoulder 14 against which is clamped the cup-shaped protecting member 15 having a strainer element 16 therebeneath. The tube 17 is riveted to the upper end of the tube 13 and serves as a clamping means for holding the member 15 against the shoulder 14. A suitable gasket 15' is placed between the member 15 and the plate 7 in order to prevent leakage of lubricant around the strainer 16. The tubular member 13 is provided with openings 13' for connecting the interior of said member with the space just beneath the strainer 16. The upper end of the tube 17 is flattened, as at 18, for providing a convenient grip for screwing the member 13 into the opening 8 and also for a further purpose to be hereinafter described.

The pump part of my new and improved unit comprises a cylinder 4 located entirely within the base 3 of the reservoir 3', the ends of said cylinder terminating in planes passing through the ends of said reservoir. My novel piston 19 consists of two oppositely extending cup leathers separated by a metallic washer and secured to the reduced end of the piston rod 20 by means of a screw 21. The end of the rearwardly extending cup leather is forced outwardly by a diagonal washer 22 which receives the thrust of a spring 23, the opposite end of the spring abutting against a washer 24 which rests against the shoulder formed by the reduced end of the piston rod. This construction maintains an effective seal between the piston and the cylinder during the suction stroke of the piston and prevents the entry of air into the system. A drain 25 is located rearwardly of the cylinder and on the engine side of the dash 1, so that any lubricant which gets past the piston will drain into the engine compartment and cannot get into the operator's compartment where it might soil the clothes of the occupants thereof.

The piston rod 20 extends through the dash and into the operator's compartment and terminates in a handle 26 conveniently located for manual operation. The piston rod 20 is further provided with a depression 27 in which is placed a washer 28 which receives the thrust of the spring 29 for actuating the piston on its operative stroke. The spring 29 is enclosed in a protective housing 30 screwed into the bracket 2, the rear end of the spring abutting the rear end of the housing.

The forward end of the cylinder communicates with the interior of the lubricant reservoir through the valve chamber 5 and downwardly extending passages 31 and 32 which connect the bottom of the reservoir with the bottom of the valve chamber. These passages are best shown in my copending application (Case 59) Serial No. 161,281, filed of even date herewith, and which is drawn to a different embodiment of the general subject-matter disclosed herein.

In the valve chamber 5 is located a spring-pressed check valve 33 having a seat 34 of fibre, or other suitable material. The upper end of the check valve spring abuts against a plug 35 which may be removed for inspecting said valve and seat.

In the plug 35 is located a nipple 36 of a high pressure lubricating system, such as is disclosed in my Patent No. 1,475,980. A lubricant dispenser may be connected to the nipple 36 to prime the system and also to provide high pressure means for forcing therefrom any air which may become trapped therein. The conduits leading to the bearings are connected with that part of the chamber 5 above the valve 33 in a manner similar to that shown in my co-pending application above referred to.

The arrangement of the downwardly extending passages 31 and 32 causes the lubricant withdrawn from the reservoir to pass first downwardly and then upwardly through the valve chamber, thereby causing a reversal of flow which tends to separate out any impurities which may be carried by the lubricant and these impurities can be readily removed by unscrewing the plug 37. The arrangement of the passageways 31 and 32 and the valve chamber 5 also permits the use of a downwardly closing check valve which is normally closed and serves to disconnect the cylinder 4 from the pressure of the lubricant in the reservoir 3', thus eliminating all tendency of the lubricant to leak past the plunger 19.

In operating my new and improved unit, the cover 12 is first removed and lubricant poured into the reservoir 3'. The flattened upper end 18 of the tube 17 prevents the lubricant from passing down said tube while permitting air beneath the strainer 16 to pass upwardly through said tube and thus escape instead of being trapped in the bottom of the reservoir and subsequently forced into the system where it would form objectionable air traps in the conduits. The openings 13' in the tubular member 13 are provided in order to permit the escape of any air which may be confined immediately below the upper edge of the strainer 16.

After the reservoir has been filled and the cap 12 replaced, the system may be primed through the coupling 36 or the handle 26 may be pulled rearwardly several times and released between successive pulls to permit the spring 29 to actuate the piston 19 and force lubricant into the system. After the conduits of the system are completely filled with lubricant, each additional stroke of the piston forces lubricant to the bearings. After the bearings have been once lubricated, the pump should be operated only at infrequent intervals, depending upon the use to which the vehicle is put.

It is to be understood that various modifications may be made within the scope of my invention and that the quantity of lubricant delivered by one stroke of the piston may be varied according to the manner in which the pump is to be used. I prefer, however, to so design the pump that one stroke thereof will deliver a sufficient quantity of lubricant properly to lubricate all of the bearings in the system.

What I claim is:

1. In apparatus of the class described, a lubricant reservoir, a strainer adjacent the bottom thereof, an air vent tube having one end extending below said strainer and the other end terminating adjacent the top of said reservoir, the upper end of said tube being flattened so that no lubricant can pass down said tube when said reservoir is filled, said flattened portion permitting air to pass outwardly therethrough during the filling operation.

2. In apparatus of the class described, a lubricant reservoir, a strainer adjacent the bottom thereof, and an air vent tube extending upwardly through said strainer, said strainer being carried by said tube, said tube being flattened adjacent its upper end for preventing lubricant passing downwardly therethrough and to further provide a convenient handle for screwing said tube into a securing means carried by said reservoir.

3. In apparatus of the class described, a lubricant reservoir, a supporting member adjacent the bottom thereof and extending transversely of said reservoir, a tubular member adapted to be threadedly engaged with said supporting member, a strainer carried by said tubular member, and a flattened end on said tubular member serving as a handle for securing said tubular member and strainer in the base of said reservoir, said flattened portion further providing a restricted passage permitting venting of air from beneath said strainer during the filling of said reservoir.

In witness whereof, I hereunto subscribe my name this 30 day of December, 1926.

OSCAR U. ZERK.